UNITED STATES PATENT OFFICE.

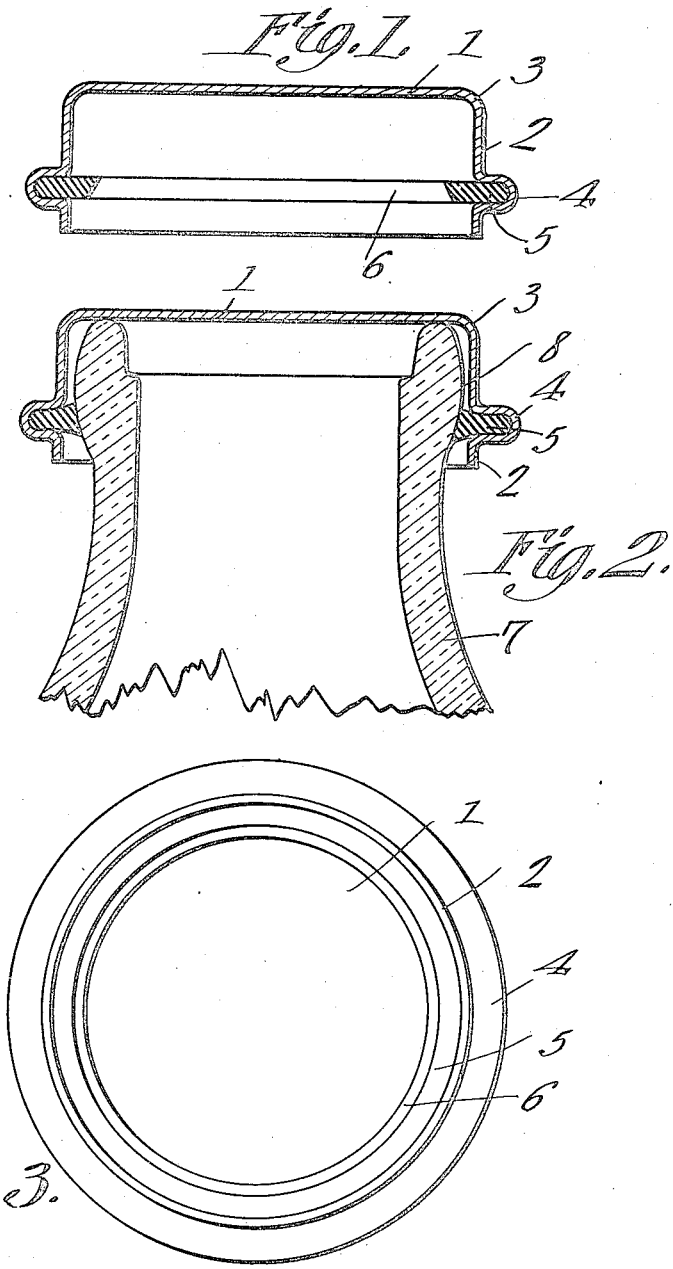

DODSON HASLUP, OF GRAFTON, WEST VIRGINIA.

MILK-BOTTLE CAP OR COVER.

1,151,875.

Specification of Letters Patent. Patented Aug. 31, 1915.

Application filed March 22, 1915. Serial No. 16,144.

*To all whom it may concern:*

Be it known that I, DODSON HASLUP, a citizen of the United States, residing at Grafton, in the county of Taylor and State of West Virginia, have invented a new and useful Milk-Bottle Cap or Cover, of which the following is a specification.

The present invention appertains to a cap or cover for milk bottles, and aims to provide a novel and improved closure for application upon a milk bottle or similar container after once the disk cap or stopper is removed, and whereby the contents of the bottle and the mouth portion thereof are prevented from being contaminated by dust, germs or other extraneous matter.

The object of the invention is the provision of a cap of unique construction and applicable over the upper end or mouth of a milk bottle or similar receptacle, for closing the bottle and protecting that portion thereof surrounding the mouth, for sanitary reasons.

Another object of the invention is the provision of a milk bottle having unique means for engaging the bead of the bottle neck, for holding the cap in place, and for providing a tight joint between the cap and bottle neck.

It is also within the scope of the invention to provide a milk bottle cap having the characteristic features above noted, and which is comparatively simple and inexpensive in construction, which may be repeatedly employed, which will be thoroughly hygienic in use, and which will serve its office in a thoroughly efficient and practical manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a diametrical section of the cap. Fig. 2 is a similar view of the cap as applied to the milk bottle. Fig. 3 is a bottom view of the cap.

In carrying out the invention, the cap 1 is stamped or otherwise formed from suitable sheet metal, and is provided with a cylindrical rim or apron 2, and a rounded corner 3. The cap 1 is of such proportions as to fit properly over the bead or mouth portion of the bottle, and the rim or apron 2 of the cap is provided adjacent but spaced from its edge, with an annular outstruck corrugation or groove 4 in which is seated or secured a relatively thick annular ring or gasket 5 of rubber or equivalent material. The ring or gasket 5 projects inwardly slightly from the rim or flange 2 of the cap, and its inner edge is provided with a downwardly facing bevel 6 forming an upper sharp lip which allows the ring or gasket to readily slip over the bead or end of the bottle, and which securely holds the cap in position upon the bottle, although the cap may be forcibly removed. The opposite walls of the corrugation are parallel and arranged at right angles with the wall of the apron, and the gasket has flat parallel sides whereby the inner free edge portion of the gasket in being bent upwardly and downwardly is not liable to displace or detach the gasket.

In applying the cap to the neck of the milk bottle 7, designated in Fig. 2, the cap is slipped over the bead 8 of the bottle neck, this being readily accomplished since the beveled edge 6 of the ring or gasket 5 will enable the ring or gasket to readily slip over and embrace the bead. The ring 5 will be expanded slightly in being slipped onto the bead, and will therefore embrace the bead tightly for holding the cap in place upon the upper end of the bottle, and furthermore, the ring or gasket will close the gap between the bead 8 and rim 2 of the cap.

The present cap is intended especially for closing the bottle after the disk stopper or cap is removed, and when the bottle is partially emptied, in order that the cap 1 in being applied to the bottle, will protect the contents thereof from contamination, and will also prevent dust, germs and foreign matter lodging upon the bead or mouth portion of the bottle neck, and this will prevent the milk being contaminated when poured from the bottle neck.

The present device may be cheaply manufactured, and is readily applicable to and removable from the bottle, although when applied to the bottle it is not liable to be accidentally detached. The cap is sanitary in use, and even when it is removed from the bottle and placed upon a shelf or other support, the ring or gasket 5 will be protected within the cap, and will not be liable to contact with the surface of the table, shelf, or other object upon which the cap is placed.

Having thus described the invention, what is claimed as new is:

A bottle cap having a cylindrical apron adapted to surround the bead of a milk bottle and having an annular outstanding corrugation spaced from its edge, the opposite walls of the corrugation being parallel and arranged at right angles with the walls of the apron, and a relatively thick gasket having flat parallel sides fitted within said corrugation and projecting inwardly slightly from said apron to engage and embrace said bead, the inner edge of the gasket having a downwardly facing bevel forming an upper sharp lip whereby the gasket may be readily slipped over the bead and will effectively hold the cap in place thereon.

In testimony that I claim the foregoing as my own, I have hereto affixed my signature in the presence of two witnesses.

DODSON HASLUP.

Witnesses:
JNO. W. MCCAFFERTY,
H. M. MURRAY.